(12) United States Patent
Kim

(10) Patent No.: US 7,079,201 B2
(45) Date of Patent: Jul. 18, 2006

(54) FLUORESCENT LAMP AND LIQUID CRYSTAL DISPLAY DEVICE HAVING THE SAME

(75) Inventor: Bo Sung Kim, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 706 days.

(21) Appl. No.: 09/924,677

(22) Filed: Aug. 9, 2001

(65) Prior Publication Data

US 2002/0060759 A1 May 23, 2002

(30) Foreign Application Priority Data

Aug. 10, 2000 (KR) ............................... 2000-46359

(51) Int. Cl.
*G02F 1/1335* (2006.01)

(52) U.S. Cl. ........................... 349/70; 349/23; 349/73; 349/89

(58) Field of Classification Search ................ 349/23, 349/89, 73; 313/485, 483, 486, 487
See application file for complete search history.

(56) References Cited

U.S. PATENT DOCUMENTS 6,445,119 B1 * 9/2002 Mori et al. .................. 313/485
6,452,324 B1 * 9/2002 Soules et al. ............... 313/486

FOREIGN PATENT DOCUMENTS

KR 2000021095 * 9/1998

* cited by examiner

*Primary Examiner*—Carl Whitehead, Jr.
*Assistant Examiner*—Yennhu B Huynh
(74) *Attorney, Agent, or Firm*—McGuireWoods LLP

(57) ABSTRACT

A fluorescent lamp for a backlight of a liquid crystal display device and a liquid crystal display device having the same are disclosed. The fluorescent lamp includes a red color phosphor having a maximum luminous wavelength of about 600 nm to 620 nm, a green color phosphor having a maximum luminous wavelength of about 520 nm to 555 nm and a blue color phosphor having a maximum luminous wavelength of about 440 nm to 460 nm. The green color phosphor has one maximum luminous peak or the side peak having about 20% or smaller relative size in comparison with the maximum luminous peak beside the maximum luminous peak. Therefore, by removing or minimizing the side luminous peak of the green color phosphor, the color reproductivity can greatly increase without decreasing the brightness of the white color.

12 Claims, 8 Drawing Sheets

FLUORESCENT LAMP AND LIQUID CRYSTAL DISPLAY DEVICE HAVING THE SAME

BACKGROUND OF THE INVENTION

1. Field of the Invention

The present invention relates to a fluorescent lamp and a liquid crystal display device having the same, and more particularly to a fluorescent lamp for a backlight of a liquid crystal display device capable of improved color reproduction and a liquid crystal display device having the same.

2. Description of the Related Art

Recently, to the rapid technical progress in the semiconductor industry, enabled electronic products to achieve improved performance, in a smaller size and with a lighter weight. A cathode ray tube (CRT), which is being widely used as an information display device, has a lot of advantages in view of performance and price-wise. However, its size cannot be minimized enough for portable uses. On the contrary, due to the advantages such as small sizen, light-weight and low power consumption, a liquid crystal display device is being noted as a substitute device to overcome the disadvantages of the CRT and now widely used for almost all of the information processing apparatuses which need display device.

The liquid crystal display device is a device that uses light modulation of the liquid crystal cells which applies a voltage to a molecular arrangement of liquid crystal to convert its molecular arrangement and changes the optical properties of liquid crystal cells that transmit light, such as a double refractivity, a polarization, a dichromaticism, and a light-scattering characteristic, as a visual properties.

Since the liquid crystal display device is a passive light element which is unable to emit the light by itself, a backlight assembly for providing the liquid crystal panel with the light is attached to the rear surface of the liquid crystal panel. A light transmissitivity of the liquid crystal panel is controlled by the applied electrical signal and, in response to the control, an image or a moving image is displayed on the liquid crystal panel.

As aforementioned above, since the liquid crystal display device controls the quantity of light transmitted onto the screen using the liquid crystal and decides a contrast and a color of the screen utilizing the light, the liquid crystal display device shows some different characteristics other than general display devices. For example, there are issues of an angle of visibility that makes the quality of the image remarkably different according to the angle of watching the screen, a transmissitivity according to a projection type light-emitting display, a color reproductivity according to how much the light passed through a color filter reproduces red R, green G and blue B colors, a luminance representing the contrast of the screen, and an after-image that remains for a long time after a same image stays long.

Currently, the liquid crystal display device, which has been mainly used in a display device of portable products, is now expanding its area into a desktop PC monitor and a television set. The liquid crystal display device has some physical advantages such as light-weight, thin-thickness, short-length and small-size, however, among the aforementioned characteristics, it is especially weak in view of the color reproductivity and a luminance in comparison with the CRT. Though the pre-existing liquid crystal display device for a notebook computer monitor has only about 40 to 50% of the color reproductivity compared to the national television system committee (hereinafter, referred to as "NTSC") method which is adopted as a color television broadcasting method by American NTSC, it is still able to fulfill the needs of users. However, for a TV set noted as a new market for liquid crystal display device, of the liquid crystal display device needs to be developed to have at least same color reproductivity as the CRT or better color reproductivity is required.

Largely, a general multi-color liquid crystal display device comprises of the liquid crystal panel, the backlight and the color filter. That is to say, the multi-color liquid crystal display device utilizes a backlight of a three-wave fluorescent lamp as a light source and separates a white color light emitted therefrom through the color filter into three primary colors of red, green and blue, and then produces various colors by an additive color mixing method.

A color of an optional light source is decided by a chromaticity coordinates which is made by a Commission Internationale d'Eclairage (hereinafter, referred to as "CIE"). That is, after the tristimulus values X, Y and Z are calculated from the spectrum of the optional light source, the chromaticity coordinates of the red, green and blue x, y and z are obtained by a conversion matrix from the tristimulus values. Next, when the x, y and z value of the red, green and blue are represented as a vertically intersect coordinates, a horse's hoofs-shaped spectral locus is drawn. It is called as a CIE chromaticity diagram and all of the normal light sources have their chromaticity diagram inside the horse's hoof-shape. At this time, a triangle area made by each chromaticity coordinates of the red, green and blue becomes the color reproduction area and the larger the triangle area becomes, the more the color reproductivity increases. The color reproductivity depends on a saturation and a brightness and the color reproductivity increases when the saturation and brightness becomes higher. In here, the tristimulus values x, y and z represent the weighted values of an individual color-matching function approached to a certain spectrum, especially, y represents the stimulus values of the brightness.

Meanwhile, a color temperature indicates a color of the white color on the basis of color change of the light emitted according to the temperature of the heating source as the temperature, and the color temperature on the monitor is largely presented in three degrees, as 9300K, 6500K and 5000K. When the color temperature is near 9000K, the white color having the blue color is represented, when the color temperature is near 6500K, the white color having the red color is represented, and when the color temperature is near 5000K, an intermediate color is represented. The color temperature is obtained from the chromaticity coordinates x and y of the white color, and when the color temperature is near 9000K, it can satisfy the standard of European Broadcasting Union (hereinafter, referred to as "EBU").

In case of the above-mentioned liquid crystal display device, the tristimulus values with respect to the each wavelength of a visible ray area is decided by compounding a luminous spectrum of the backlight with the color-matching function and a transmit spectrum of the color filter, so the co-relative relation between the backlight, the color filter and the tristimulus values should be adequately controlled to reproduce various color. Namely, the luminous spectrum of the backlight has to be changed to optimize the color reproductivity and the color temperature, and the transmit spectrum of the color filter should be adjusted to optimize a luminous efficiency.

Presently, the characteristics of the color filter formed as a color resist of a pigment dispersing type is as follows.

FIG. 1 is a graph illustrating a transmission spectral distribution of a high saturation color filter. In the graph, the "x" axis represents a wavelength (nm) and the "y" axis represents a transmission degree (%).

Referring to FIG. 1, the color reproductivity of the high saturation color filter is 67% on the basis of a standard white color light (C) when compared with to the NTSC method, a white brightness (Yw) is 30.5, and a color temperature is 6643K (chromaticity coordinates of the white color x=0.31, y=0.33). In comparison with the EBU standard, the green color and blue color are much insufficient. Here, the C light source means a standard daylight of a cloudy day, in another words, about 6774K degrees of the color temperature according to International Practical Temperature Scale.

In case of a recently developed color filter for the TV that meets the EBU standard, a method to control the matching ratio of each of the toning pigment is used to compensate the chromaticity coordinate values of the insufficient green color and the blue color. However, according to the method, a loss of the blue color transmission degree on the spectrum increases a lot in comparison with the pre-existing color filter. In developing the color filter for the TV, obtaining excellent color reproductivity at the expense of transmission degree is not a good approach because it wastes light source. Accordingly, it is designed to compensate the loss of the transmission by increasing the luminance of the backlight.

Presently, a cold-cathode ray fluorescent lamp is used as a light source for a the backlight of the liquid crystal display device. In light-emitting material and principle, the cold-cathode ray fluorescent lamp is able to be operated in low current, emits less heat and has longer lifetime without big differences from a general fluorescent lamp. The cold-cathode ray fluorescent lamp includes a glass tube with phosphor spread onto an inner wall and electrodes attached at both ends of the glass tube. The glass tube is sealed by a rare gas such as an argon (Ar) and a fixed quantity of hydrargyrum (Hg).

When a voltage is applied to the electrodes, electrons are emitted to ionize the gas in the glass tube. By the ionization and reunion of the ion and electron, a discharging of about 253.7 nm begins. The discharging excites the hydrargyrum (Hg) to generate a ultraviolet ray of 254 nm. The ultraviolet ray stimulates the phosphor spread onto the tube wall to emit a visible ray.

The fluorescent lamp developed earlier is not designed to consider the color reproductivity of the liquid crystal display device. Therefore, the concept of color separation of the three-wave light from the light source through the color filter is not included. Instead, development is progressed only in view of the color temperature, the high luminance, the long lifetime and the high efficiency. Accordingly, in the liquid crystal display device which needs various color realization of the light emitted from the three-wave phosphor having maximum luminous efficiency in each of the red, green and blue color area of the light source by means of the additive color mixing through the color filter, the cold-cathode ray fluorescent lamp presently used does not have a satisfactory luminous spectral shape.

Recently, in developing of a TV-liquid crystal display device with the high saturation, the color reproductivity is maximum 70% when applying a color filter for a television set. So, the TV-liquid crystal display device is under development in direction to move the place of the CIE chromaticity coordinates into the EBU area by means of adjusting the phosphor ratio of the fluorescent lamp to increase the color temperature of the white color. However, the gain range of the color reproductivity that can be obtained by adjusting the three-wave phosphor ratio is very small within about 2% maximum. Accordingly, the phosphor now in use has to be changed to or substituted with an appropriate phosphor for the TV-liquid crystal display device to obtain higher color reproductivity.

SUMMARY OF THE INVENTION

Therefore, it is a first object of the present invention to provide a fluorescent lamp for a backlight of a liquid crystal display device capable of improving a color reproductivity.

It is a second object of the present invention to provide a liquid crystal display device having the fluorescent lamp.

To achieve the first object of the present invention, a fluorescent lamp comprises a red color phosphor having a maximum luminous wavelength within the range of about 600 to 620 nm, a green color phosphor having a maximum luminous wavelength within the range of about 520 to 555 nm and a blue color phosphor having a maximum luminous wavelength within the range of about 440 to 460 nm, wherein the green color phosphor has only one maximum luminous peak corresponding to the maximum luminous wavelength within the range of about 520 to 555 nm.

Also, the first object of the present invention can be achieved by means of a fluorescent lamp which comprises a red color phosphor having a maximum luminous wavelength within the range of about 600 to 620 nm, a green color phosphor having a maximum luminous wavelength within the range of about 520 to 555 nm, a blue color phosphor having a maximum luminous wavelength within the range of about 440 to 460 nm, wherein the green color phosphor has a maximum luminous peak corresponding to the maximum luminous wavelength within the range of about 520 to 555 nm and a side peak having about 20% or smaller size compared with the maximum luminous peak.

Also, the first object of the present invention can be achieved by means of a fluorescent lamp which comprises a red color phosphor having a maximum luminous wavelength within the range of about 600 to 620 nm, a green color phosphor having a maximum luminous wavelength within the range of about 520 to 555 nm, a blue color phosphor having a maximum luminous wavelength within the range of about 400 to 420 nm, wherein the blue color phosphor has a luminous spectral distribution of a line shape.

To achieve the second object of the present invention, a liquid crystal display device having a fluorescent lamp comprises a red color phosphor having a maximum luminous wavelength within the range of about 600 to 620 nm, a green color phosphor having a maximum luminous wavelength within the range of about 520 to 555 nm, a blue color phosphor having a maximum luminous wavelength within the range of about 440 to 460 nm, wherein the green color phosphor has only one maximum luminous peak corresponding to the maximum luminous wavelength within the range of about 520 to 555 nm.

Also, the second object of the present invention can be achieved by means of a liquid crystal display device having a fluorescent lamp which comprises a red color phosphor having a maximum luminous wavelength within the range of about 600 to 620 nm, a green color phosphor having a maximum luminous wavelength within the range of about 520 to 555 nm, a blue color phosphor having a maximum luminous wavelength within the range of about 440 to 460 nm, wherein the green color phosphor has a maximum luminous peak corresponding to the maximum luminous wavelength within the range of about 520 to 555 nm and a side peak having about 20% or smaller size compared with the maximum luminous peak.

Also, the second object of the present invention can be achieved by means of a liquid crystal display device having a fluorescent lamp which comprises a red color phosphor having a maximum luminous wavelength within the range of about 600 to 620 nm, a green color phosphor having a maximum luminous wavelength within the range of about 520 to 555 nm, a blue color phosphor having a maximum luminous wavelength within the range of about 440 to 460 nm, wherein the blue color phosphor has a luminous spectral distribution of a line shape.

According to the present invention, the color reproductivity can be greatly improved without decreasing a brightness by forming the green phosphor, which constitutes the fluorescent lamp for the backlight of the liquid crystal display device, either to have only one maximum luminous peak or to have the maximum luminous peak and the side peak having about 20% or smaller size compared with the maximum luminous peak.

BRIEF DESCRIPTION OF THE DRAWINGS

The above objects and other advantages of the present invention will become more apparent by describing in detail with reference to the attached drawings, in which.

DESCRIPTION OF THE PREFERRED EMBODIMENT

A description of the preferred embodiments according to the present invention will be given below in detail with reference to the accompanying drawings.

The following Table 1 shows characteristics of phosphors used in a cold-cathode ray fluorescent lamp for a backlight.

TABLE 1

| Color | Composition | Weight | Peak (nm) | Band-width (nm) |
| --- | --- | --- | --- | --- |
| Blue (B) | $BaMg_2Al_{16}O_{27}$:Eu | 3.83 | 450 | 53 |
| Green (G) | $LaPO_4$:Ce,Tb | 5.20 | 544 | Line |
| Red (R) | $Y_2O_3$:Eu | 5.05 | 611 | Line |

Most manufacturers of a liquid crystal display device use the phosphors described in the above-stated Table 1 in the cold-cathode ray fluorescent lamp. Till these days, the three-wave phosphor is known to have excellent quality compared with other phosphors.

Figure 1:
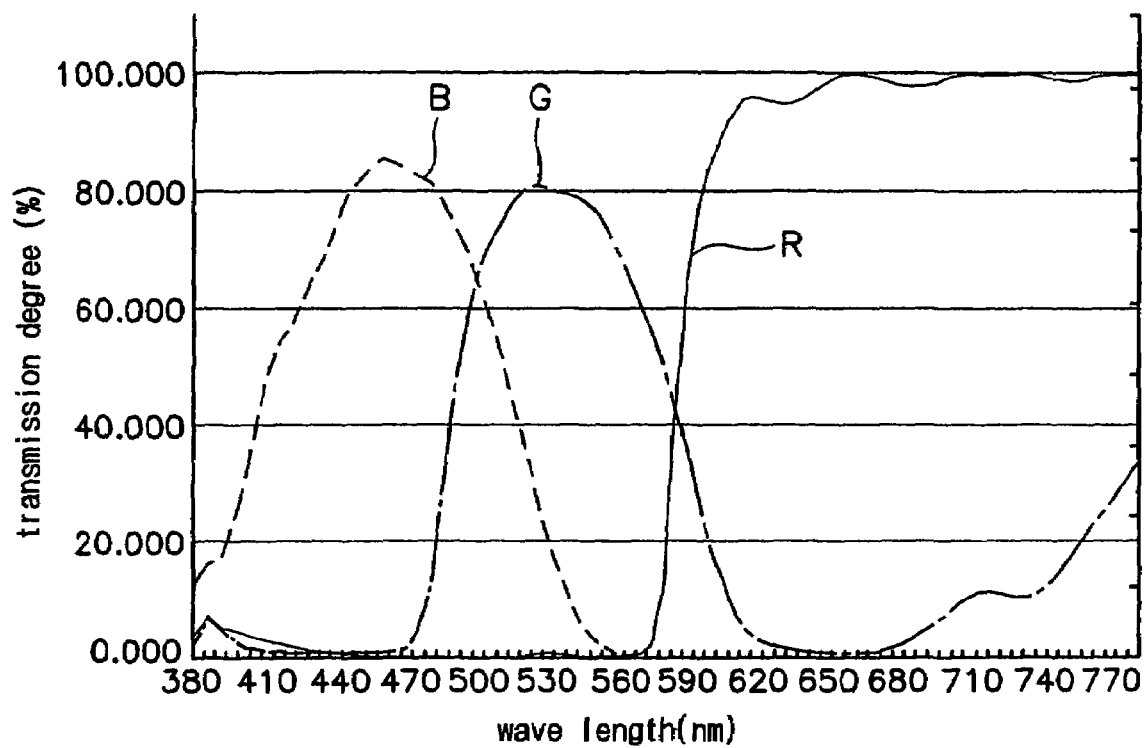
FIG. 1 is a graph showing a transmission spectral distribution of a conventional high saturation color filter.
Figure 2:
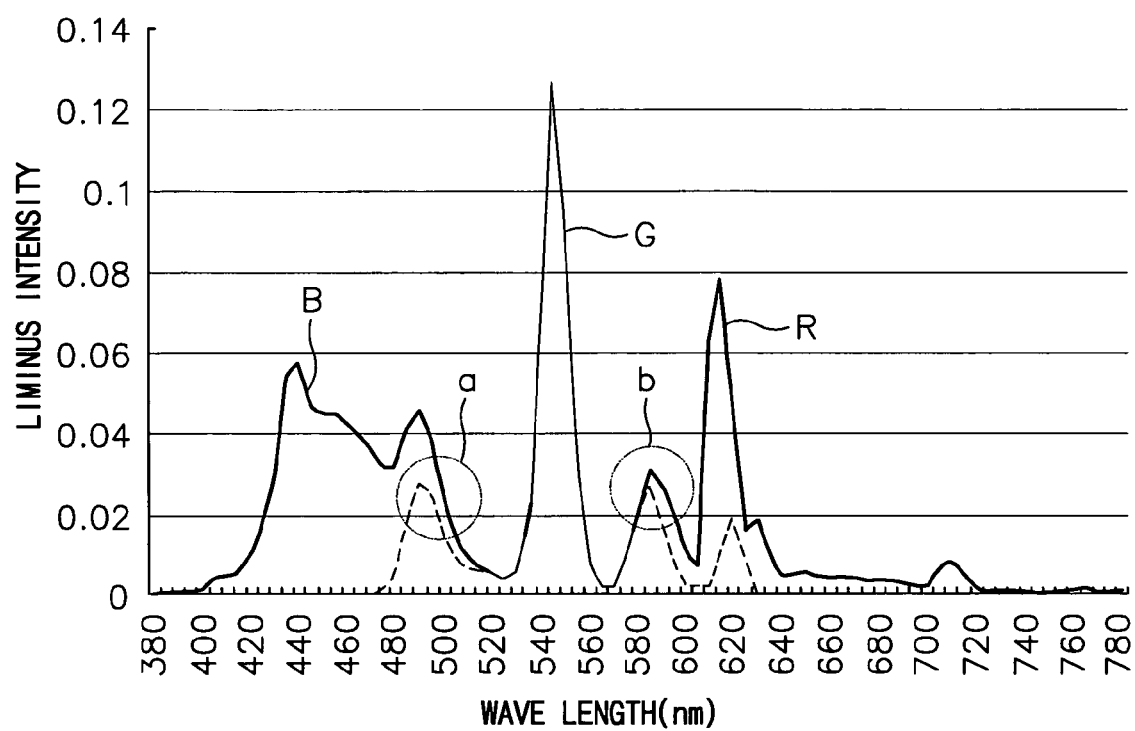
FIG. 2 is a graph showing a luminous spectral distribution of a conventional backlight.

A luminous spectral distribution of a backlight having the three-wave phosphor shown in the Table 1 is shown in FIG. 2. In here, "x" axis represents a wavelength and "y" axis represents a luminous intensity. Also, the dotted line represents a luminous spectrum of the green color phosphor.

Referring to FIG. 2, the red color phosphor is the most stable phosphor and shows a line spectrum with an excellent luminous efficiency and a color characteristic among the phosphors which are in use now. The maximum luminous wavelength (615 nm) can be required to move its area to a long wavelength area for improving the color reproductivity. However, since the brightness stimulus value of the red color that extends over the brightness of the white color in whole, a slight tuning is preferable at present state considering in view of the luminance.

In case of a blue color phosphor, due to its luminous spectrum having a wide band-width, the color saturation is low. Moreover, the x and y values of a blue color chromaticity coordinates are much less than the EBU standard, so it becomes a main factor to decrease a color temperature.

In case of a green color phosphor (refer to the dotted line), since its luminous efficiency is superior than any other phosphors developed for a lamp till now and has a long lifetime, it is employed in almost of the light source. Recently, the luminous spectrum of $LaPO_4$:Ce,Tb which is mainly used at present has four peaks, for example, at wavelengths of 490 nm, 545 nm, 585 nm and 620 nm. Among these peaks, two side peaks (585 nm and 490 nm: a, b) beside the maximum luminous peak (545 nm) can increase the luminance. However, they decrease the color reproductivity a lot. Especially, the Y stimulus value of the red color and the Y stimulus value of the green color greatly increase and offset the color reproduction area.

Accordingly, to improve the color reproductivity, the fluorescent lamp for the backlight of present invention has a red color phosphor having a maximum luminous wavelength of about 600 to 620 nm, a green phosphor having a maximum luminous wavelength of about 520 to 555 nm, and a blue phosphor having maximum luminous wavelength of about 440 to 460 nm. At this time, the green phosphor has only one maximum luminous peak corresponding to the maximum luminous wavelength of about 520 to 555 nm.

In general, in the green color phosphor of $Zn_2SiO_4$:$Mn^{2+}$ having $Mn^{2+}$ as an activator, no side peak exists beside the maximum luminous peak which luminous spectrum is about 520 to 555 nm. So, when removing the side peak of the green color light (a and b of FIG. 2), the color reproductivity improves by increasing the color saturation. On the contrary, since the luminance may decrease the light intensity, the two side peaks (488 nm and 584 nm; a and b of FIG. 2) of the green color phosphor having $Ce^{3+}$:$Tb^{3+}$ as the activator has to be removed or minimized to maintain the luminance and to maximize the color reproductivity.

Figure 3:
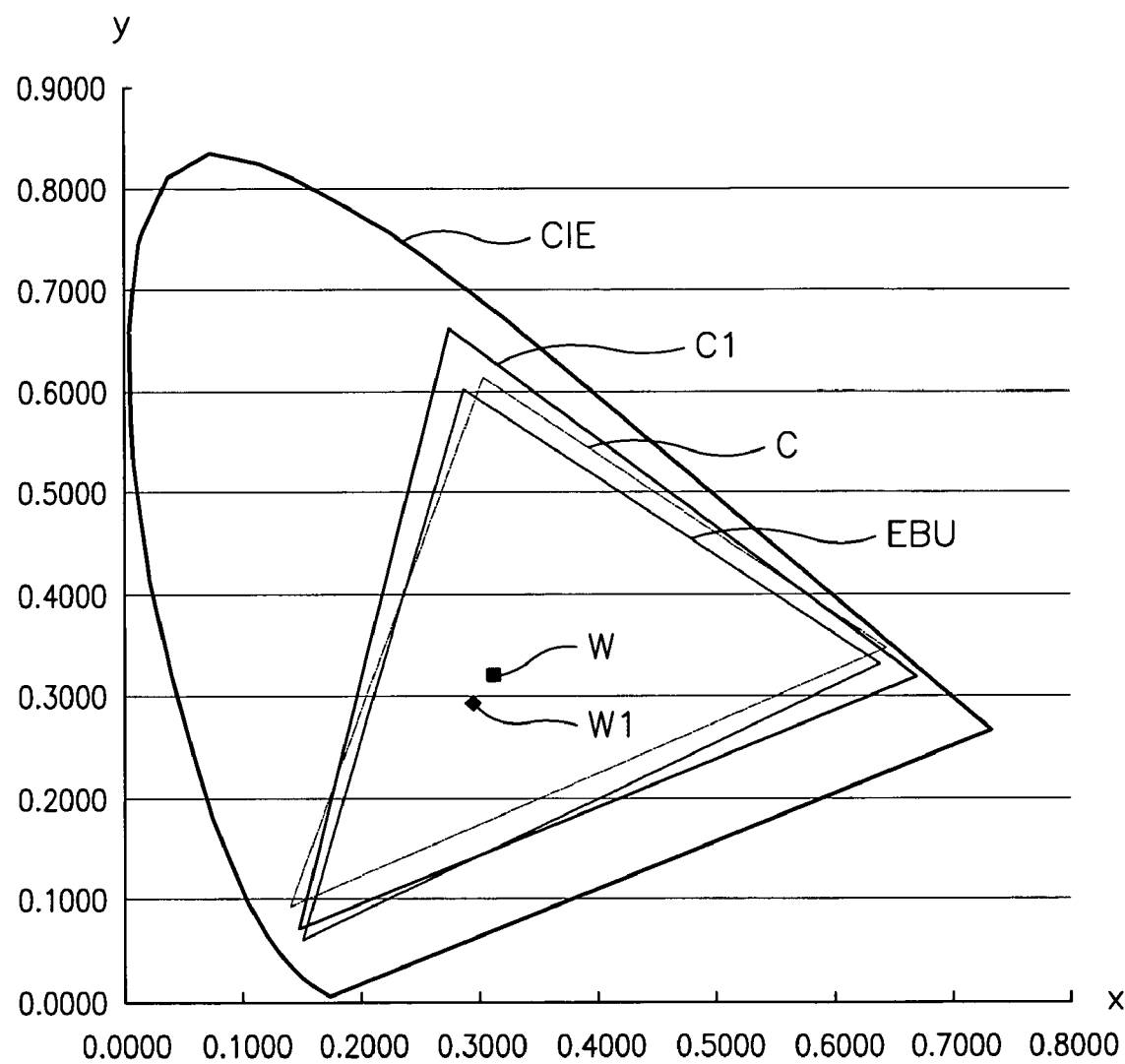
FIG. 3 is a graph showing a color reproduction area and a white color chromaticity coordinates of a backlight in which a side peak of a green color phosphor is removed through a simulation.

FIG. 3 is a graph representing the color reproduction area of the backlight and the chromaticity coordinates of white color when the side peak of the green color phosphor having the $Ce^{3+}$:$Tb^{3+}$ as the activator is removed through a simulation. In FIG. 3, the "x" axis represents the wavelength and the "y" axis represents a relative light intensity. Also, "C" and "W" represent the color reproduction area of the three-wave phosphor presently employed for the backlight and the chromaticity coordinates of the white color, respectively.

"C1" and "W1" represent the color reproduction area of the three-wave phosphor and the chromaticity coordinates of the white color after removing the side peaks (488 nm and 584 nm; a and b of FIG. 2) having $Ce^{3+}:Tb^{3+}$ as the activator.

The following Table 2 shows the chromaticity coordinates values and the color reproductivity obtained from the graph of FIG. 3.

TABLE 2

|  | Red color light | | | Green color light | | | Blue color light | | | White color light | | | Color reproductivity |
| --- | --- | --- | --- | --- | --- | --- | --- | --- | --- | --- | --- | --- | --- |
|  | x | y | Y | X | y | Y | X | y | Y | x | y | Y | (%) |
| C | 0.65 | 0.34 | 23.4 | 0.31 | 0.61 | 55.1 | 0.14 | 0.09 | 11.5 | 0.31 | 0 32 | 30.0 | 69.9 |
| C1 | 0.67 | 0.32 | 20 4 | 0.28 | 0.66 | 57 9 | 0.15 | 0.07 | 10.6 | 0.30 | 0.29 | 29.6 | 87 7 |
| EBU | 0.64 | 0.33 |  | 0.29 | 0.60 |  | 0.15 | 0.06 |  | 0.31 | 0 32 |  | 71.4 |

Here, the "x" and "y" axis represent the chromaticity coordinates values and "Y" represents a stimulus value of brightness, respectively.

As can be seen from FIG. 3 and Table 2, when removing the two side peaks (488 nm and 584 nm; a and b of FIG. 2) of the green color phosphor having $Ce^{3+}:Tb^{3+}$ as the activator, the color reproduction area increases from 70% (C) at present to 87% (C1) in comparison with the NTSC method. Also, the color temperature of the white color increases by about 1800K degrees from 6458K (C) at present to 8252K (C1) and the brightness value of the white color shows almost no changes from 30.0 (C) to 29.6 (C1).

Accordingly, in a case where the side peak is removed or minimized in the luminous spectrum of the green color phosphor beside the maximum luminous peak, the color reproductivity can be increased by 17% without decreasing the brightness of white color as aforementioned above. Also, the color characteristic approaching the EBU standard can be obtained because the color temperature of the white color increases.

EMBODIMENT 1

Figure 4:
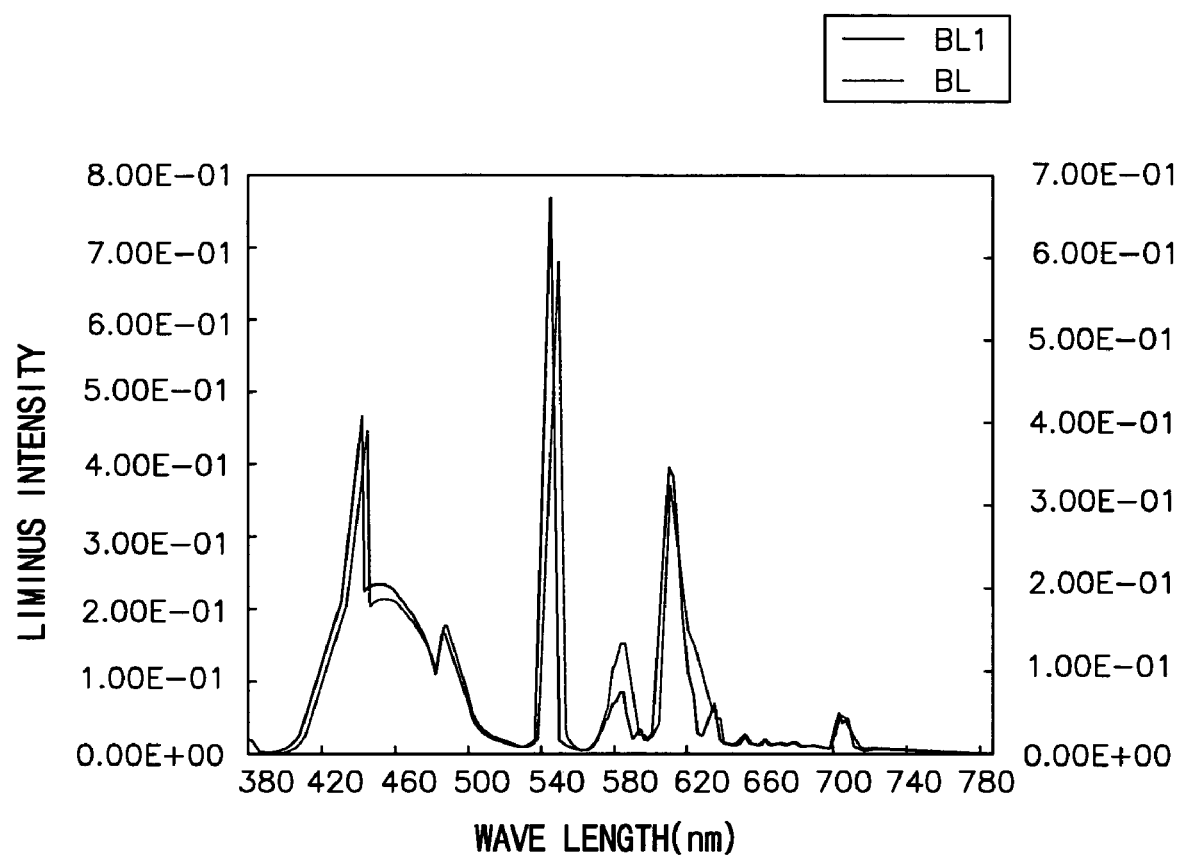
FIG. 4 is a graph showing a luminous spectral distribution of a backlight according to the first embodiment of the present invention.

FIG. 4 is a graph showing a luminous spectral distribution of a backlight according to the first embodiment of the present invention. Here, BL represents the luminous spectrum of the backlight adopted at present and BL1 represents the luminous spectrum of the backlight according to the first embodiment of the present invention.

Referring to FIG. 4, the fluorescent lamp for the backlight of the liquid crystal display device according to the first embodiment of the present invention uses a green color phosphor which has a maximum luminous spectrum of about 520 to 550 nm and a side peak having about 20% or smaller relative size in comparison with the maximum luminous spectrum. Preferably, the side peak existing under the luminous wavelength of 520 nm of the green color phosphor has about 20% or smaller compared to the maximum luminous peak, and the side peak existing over the luminous wavelength of 550 nm having about 10% or smaller compared to the maximum luminous peak.

The green color phosphor is formed by using as an activator $Ce^{3+};Tb^{3+}$. Preferably, the green color phosphor is comprised of any one among $LaPO_4:Ce^{3+}:Tb^{3+}$, $La_2O_{3x}SiO_{2y}P_2O_5:Ce^{3+}:Tb^{3+}$, $Y_2SiO_5:Ce^{3+}:Tb^{3+}$, $CeMgAlxOy:Ce^{3+}:Tb^{3+}$, $GdMgBxOy:Ce^{3+}:Tb^{3+}$, etc.

For example, when using $LaPO_4:Ce^{3+}:Tb^{3+}$ as the phosphor, the relative intensity of the side peak 488 nm and 584 nm can be minimized while maintaining the luminous efficiency similar to the previous one by controlling a density and proportion of the activator. That is, the side peak of the green color light can be minimized by controlling the density of $Tb^{3+}$ or by controlling the proportion of the $Ce^{3+}$. Accordingly, the color reproductivity and the color temperature can be improved without decreasing the brightness, when the side peak of the green color light has about 20% or smaller relative size in comparison with the maximum luminous peak.

EMBODIMENT 2

Figure 5:
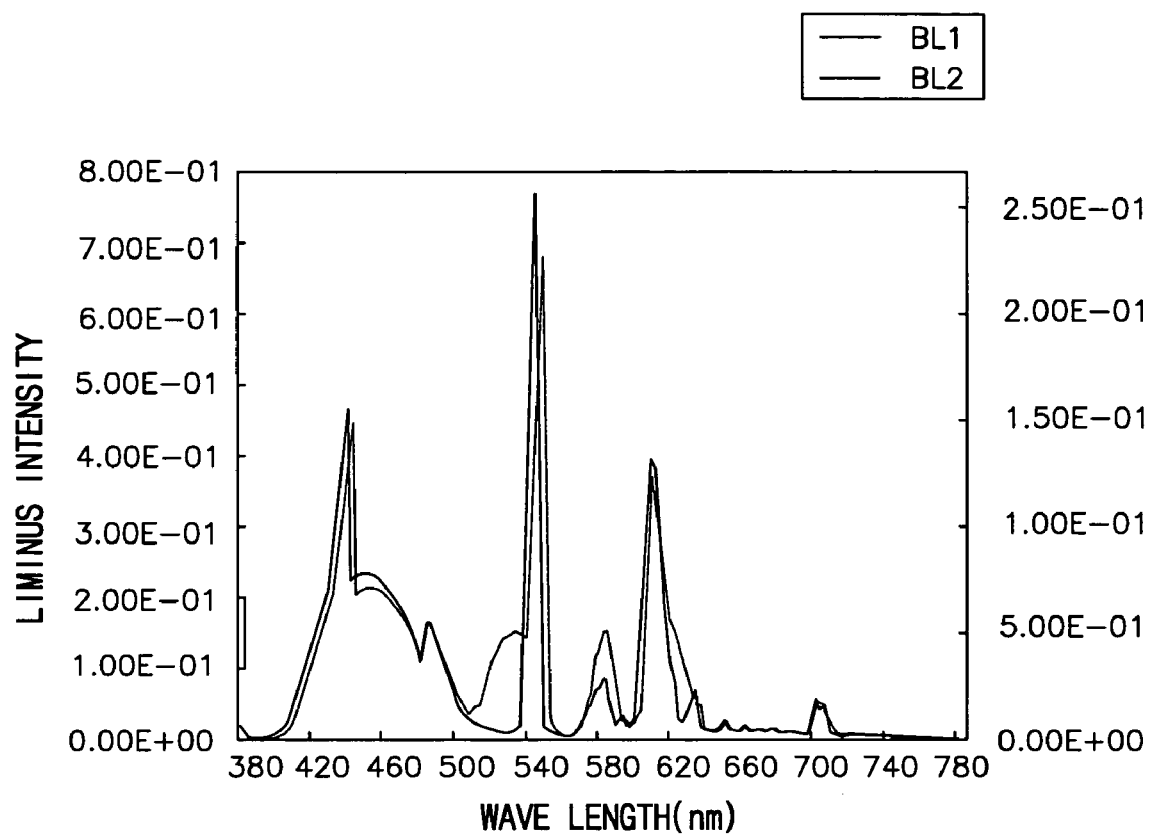
FIG. 5 is a graph showing a luminous spectral distribution of a backlight according to the second embodiment of the present invention.

FIG. 5 is a graph showing a luminous spectral distribution of a backlight according to the second embodiment of the present invention. Here, the BL1 represents the luminous spectral distribution of the backlight according to the first embodiment of the present invention, and the BL2 represents the luminous spectral distribution according to the second embodiment of the present invention.

Referring to FIG. 5, the fluorescent lamp for backlight of the liquid crystal display device according to the second embodiment of the present invention uses a green color phosphor having a maximum luminous peak of about 520 to 555 nm and a side peak having about 20% or smaller compared with the maximum luminous peak. The green color phosphor is formed by mixing at least one phosphor having $Ce^{3+}:Tb^{3+}$ as the activator with a phosphor having $Mn^{2+}$ as the activator.

Preferably, the green color phosphor is formed by mixing any one among $LaPO_4:Ce^{3+}:Tb^{3+}$, $La_2O_{3x}SiO_{2y}P_2O_5:Ce^{3+}:Tb^{3+}$, $Y_2SiO_5:Ce^{3+}:Tb^{3+}$, $CeMgAlxOy:Ce^{3+}:Tb^{3+}$, $GdMgBxOy:Ce^{3+}:Tb^{3+}$ etc. which use $Ce^{3+}:Tb^{3+}$ as the activator with a phosphor formed by $Zn_2SiO_4:Mn^{2+}$ having $Mn^{2+}$ as the activator. More preferably, the green color phosphor having $Ce^{3+}:Tb^{3+}$ as the activator is the same as the one employed in the aforementioned first embodiment.

Figure 6:
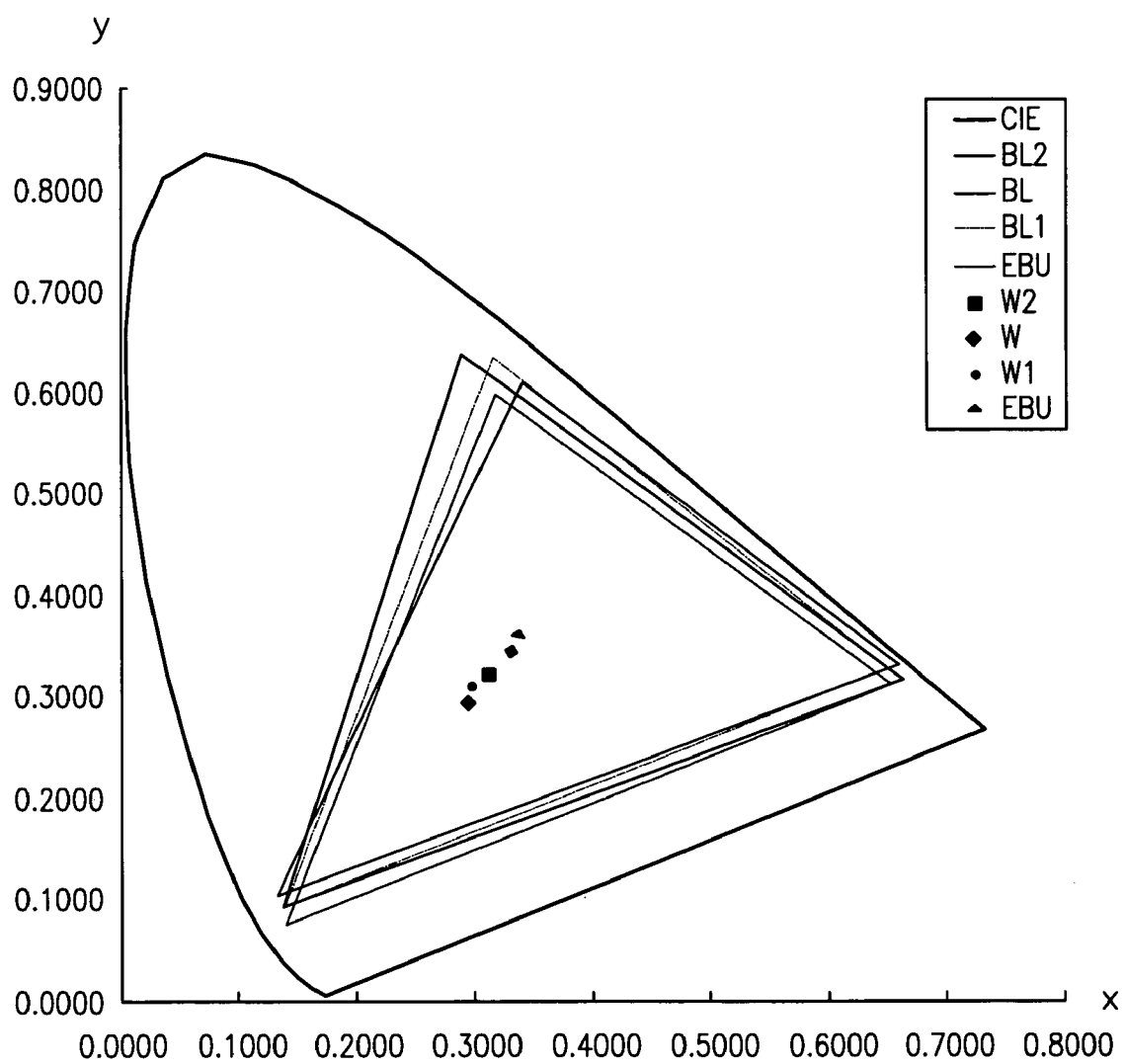
FIG. 6 is a graph showing a color reproduction area and a white color chromaticity coordinates of the backlight according to the first and the second embodiments of the present invention.

FIG. 6 is a graph showing the color reproduction area of the backlight and the chromaticity coordinates of the white color according to the first and the second embodiments of the present invention. In FIG. 6, the BL and W represent the color reproduction area of the three-wave phosphor employed to the backlight presently and the chromaticity coordinates of the white color, respectively. Also, the BL1 and W1 represent the three-wave phosphor according to the first embodiment of the present invention, and BL2 and W2 represent the three-wave phosphor according to the second embodiment of the present invention.

The following Table 3 represents the chromaticity coordinates value of the backlight and the color reproductivity according to the first and the second embodiments of the present invention obtained from the graph of FIG. 6.

TABLE 3

| | Red color light | | Green color light | | Blue color light | | White color light | | Color temperature (K) | Color reproduction (%) |
|---|---|---|---|---|---|---|---|---|---|---|
| | X | Y | x | y | X | Y | x | y | | |
| BL | 0.65 | 0.34 | 0.31 | 0 61 | 0.14 | 0 09 | 0.31 | 0.32 | 6458 | 69.9 |
| BL1 | 0.641 | 0.336 | 0.282 | 0.645 | 0.149 | 0.079 | 0.295 | 0.305 | 8008 | 77.2 |
| BL2 | 0 646 | 0.334 | 0.261 | 0.642 | 0.29 | 0.077 | 0.289 | 0.296 | 8794 | 80.0 |

As can be seen from FIG. 6 and Table 3, the color reproductivity of the fluorescent lamp of the backlight according to the first and the second embodiments of the present invention increases from 69.9% (BL) at present to 77.2% (BL1) or to 80.0% (BL2) in comparison with to the NTSC method, and the color temperature increases by about 2000K from 6458K (BL) to 8008 (BL1) or 9794 (BL2).

Also, the color reproductivity of the backlight using green color fluorescent, which is compounded of two or more of the phosphor formed by $Ce^{3+}:Tb^{3+}$ as the activator according to the second embodiment of the present invention and the phosphor formed by $Mn^{2+}$ as the activator, increases by 2.8% compared to the aforementioned first embodiment (BL1) and the color characteristics also are improved.

As described above, according to the first and the second embodiments of the present invention, the color reproductivity is improved by changing the luminous spectrum characteristic of the green color phosphor. However, with only this method, the blue color chromaticity coordinate is still insufficient compared to the EBU standard as shown in FIG. 6. Therefore, to realize perfect color reproductivity, the chromaticity coordinates of the blue color have to be changed to the EBU standard.

EMBODIMENT 3

Figure 7:
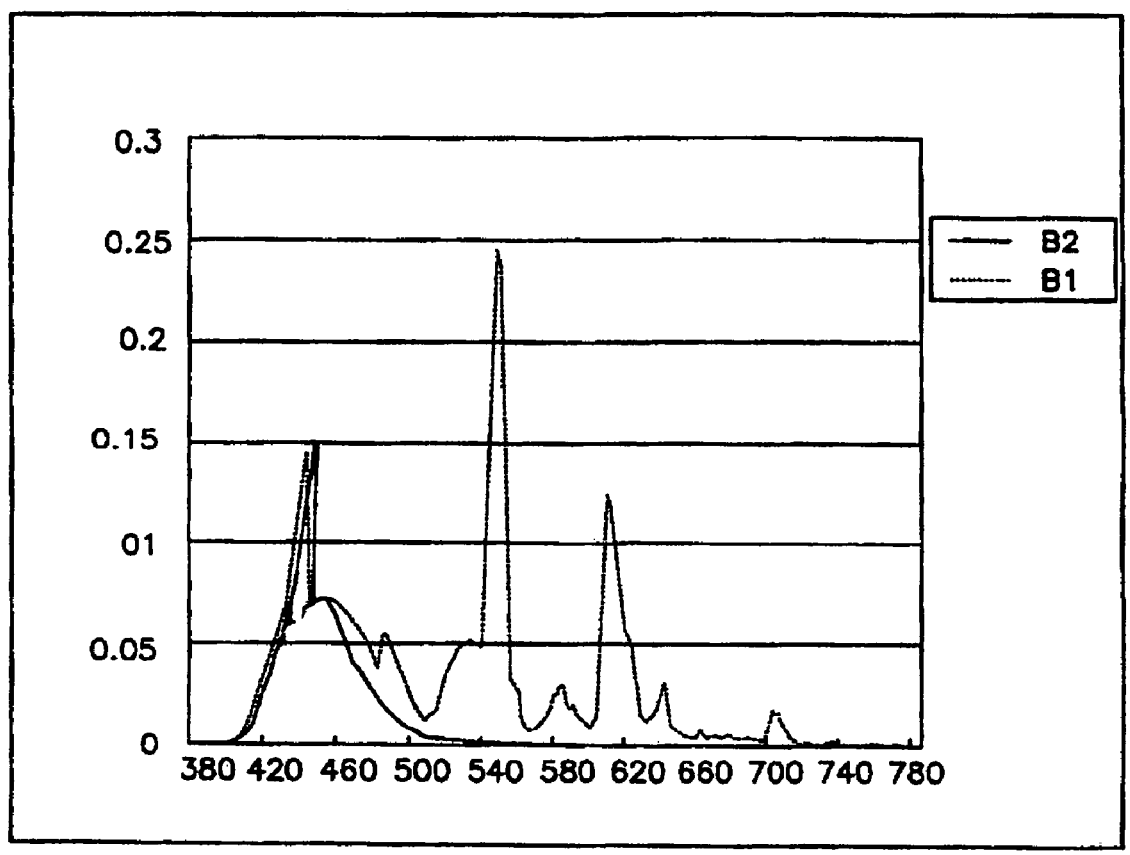
FIG. 7 is a graph showing a luminous spectral distribution of a blue color phosphor used for a backlight according to the third embodiment of the present invention.

FIG. 7 is a graph showing the luminous spectral distribution of a backlight according to the third embodiment of the present invention. Here, B1 represents the luminous spectrum of the blue color phosphor employed in the second embodiment of the present invention and B2 represents the luminous spectrum of the blue color phosphor according to the third embodiment of the present invention.

Referring to FIG. 7, the fluorescent lamp for the backlight of the liquid crystal display device according to the third embodiment of the present invention is composed of the same red color phosphor and the green phosphor employed by the aforementioned first and the second embodiments, and the blue color phosphor has the luminous spectrum with width smaller than the luminous spectrum employed by the aforementioned first and the second embodiments.

Preferably, the fluorescent lamp for the backlight of the liquid crystal display device, as same as the above stated second embodiment, is composed of a red color phosphor having a maximum luminous wavelength of about 600 to 620 nm, a green color phosphor having a maximum luminous wavelength of about 520 to 555 nm and a side peak which has about 20% or smaller compared to the maximum luminous peak, in which two or more of the phosphor having $Ce^{3+}:Tb^{3+}$ as the activator and the phosphor having Mn+ as the activator are mixed, and a blue color phosphor having a maximum luminous wavelength of about 440 to 460 nm.

Preferably, the blue color phosphor according to the third embodiment of the present invention has a maximum luminous peak at the wavelength within the range of about 440 to 460 nm, the spectrums of both side of the maximum luminous peak are formed in a line shape of which slopes are substantially identical. The line shape has to be maintained within the 30% of the maximum peak to realize the high color saturation.

More preferably, in the blue color phosphor, the half bandwidth that is wavelength area at the light intensity corresponding to the half of the maximum luminous peak should be 40 nm or less.

The blue color phosphor having the luminous spectrum of the line shape comprised of strontium group phosphor, preferably, any one among $Sr10(PO4)6Cl2:Eu^{2+}$, $(Sr,Ca)10(PO4)6Cl2:Eu^{3+}$ and $(Sr,Ca)10(PO4)6nB2O3:Eu^{2+}$, etc. At this time, the maximum luminous wavelength can be controlled by replacing one part of Sr with Ca or Ba, and the luminous intensity can increase by means of replacing some part of the phosphor with $B_2O_3$.

The maximum luminous wavelength of the blue color phosphor $BAM(BaMg_2Al_{16}O_{27}:Eu)$ which is used a lot presently is appropriately placed as about 440 to 460 nm, it has a limit to change the luminous spectrum by changing the matrix composition or the density of the activator. Also, since the activator is unstable, it has a defect in the lifetime and the luminance. Accordingly, when using the blue color phosphor of the strontium group instead of the BAM, a sharp luminous spectrum having a half bandwidth of about 32 nm and a maximum luminous wavelength of about 447 nm can be obtained. When the line shape of the luminous spectrum is formed sharply, a color near an original color can be obtained because the color saturation improves. As a result, the color reproductivity can be improved. Also, since the luminous peak of the Hydrargyrum (Hg) sealed into the glass tube of the fluorescent lamp is shown at a wavelength of about 440 nm and broadly positioned in the blue color area, the luminance of blue color increases and the color reproductivity can be improved.

Figure 8:
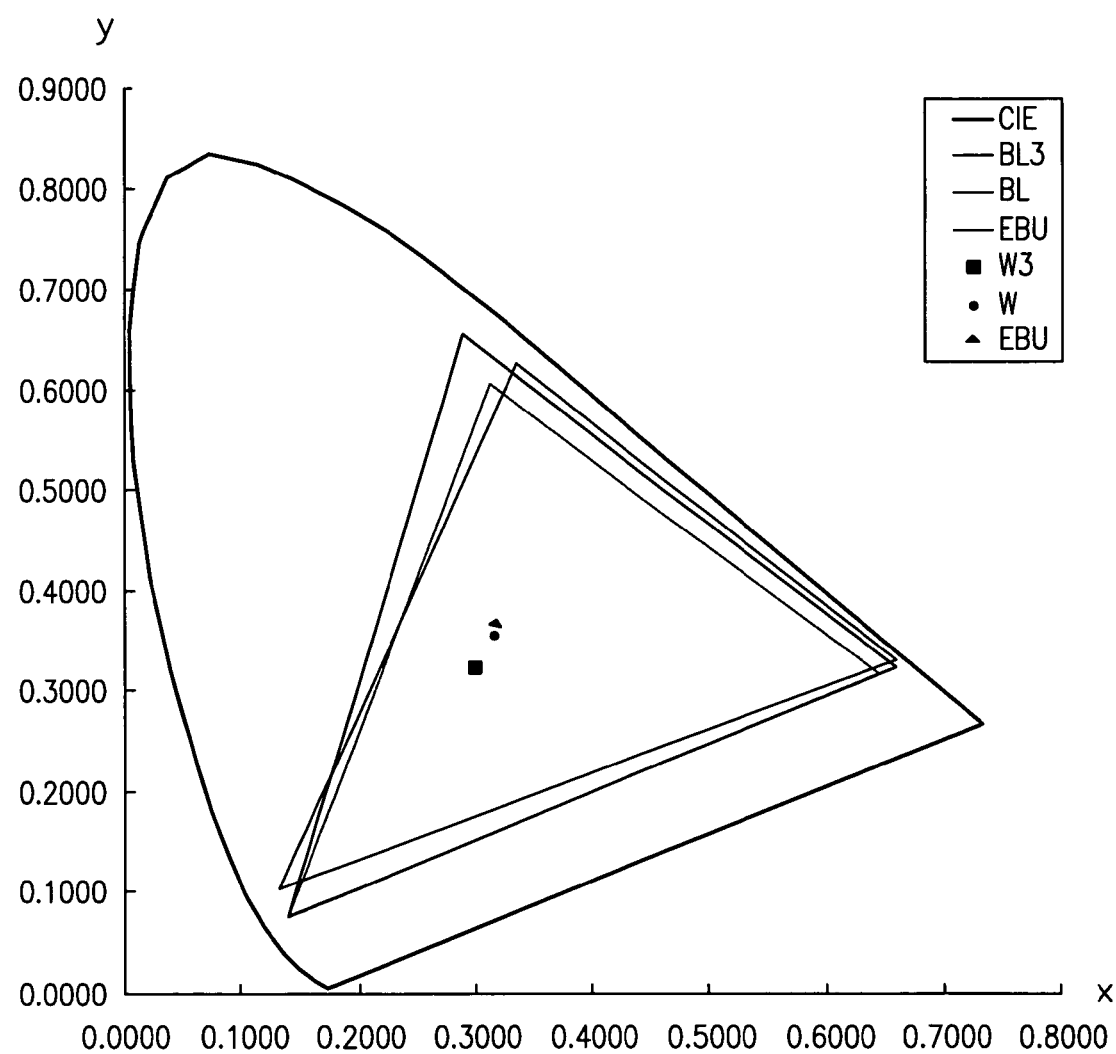
FIG. 8 is a graph showing a color reproduction area and a white color chromaticity coordinates of the backlight according to the third embodiment of the present invention.

FIG. 8 is a graph showing the color reproduction area of the backlight and the chromaticity coordinates of the white color according to the third embodiment of the present invention. In FIG. 8, the BL and W represent the color reproduction area of the three-wave phosphor employed by the backlight presently used and the chromaticity coordinates of the white color, respectively. Also, BL3 and W3 represent the color reproduction area of the three-wave phosphor and the chromaticity coordinates of the white color according to the third embodiment of the present invention.

The following Table 8 represents the chromaticity coordinates value and the color reproductivity obtained from FIG. 8.

TABLE 4

| | Red color light | | Green color light | | Blue color light | | White color light | | Color temperature (K) | Color reproduction (%) |
|---|---|---|---|---|---|---|---|---|---|---|
| | X | Y | x | Y | X | y | x | y | | |
| BL3 | 0.645 | 0.334 | 0.261 | 0.640 | 0.153 | 0.062 | 0.286 | 0.295 | 9114 | 80.6 |
| BL | 0.65 | 0.34 | 0.31 | 0.61 | 0.14 | 0.09 | 0.31 | 0.32 | 6458 | 69.9 |

As can be seen from FIG. 8 and Table 4, according to the fluorescent lamp for the backlight consisting of the green color phosphor having the maximum luminous peak and the side peak which has about 20% or smaller compared with the maximum luminous peak, in which two or more of the phosphor having $Ce^{3+}:Tb^{3+}$ as the activator and the phosphor having $Mn^+$ as the activator are mixed, and a blue color phosphor of strontium group, the color reproductivity increases by about 10% from present 69.9% (BL) to 80.6% (BL3) in comparison with to the NTSC method and wholly covers the EBU area. Largely, the color characteristics can be represented by means of the color reproductivity, the color temperature of the white color and the brightness of the white color. When the chromaticity coordinates value "y" of the blue color decreases, the color characteristic of the backlight is improved because the color reproductivity and color temperature of white color increases.

According to the present invention as aforementioned above, the green color phosphor of the fluorescent lamp for the backlight of the liquid crystal display device is formed to have one maximum luminous peak or the side peak having about 20% or smaller relative size in comparison with the maximum luminous peak beside the maximum luminous peak. Therefore, by means of removing or minimizing the side luminous peak of the green color phosphor, the color reproductivity and the color temperature can greatly increase without decreasing the brightness of the white color. Also, the color reproductivity, which wholly covers the EBU area, can be realized by changing the luminous spectrum of the blue color fluorescent approximately to the line shape.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A fluorescent lamp comprising:
   a red color phosphor having a maximum luminous wavelength within the range of about 600 to 620 nm;
   a green color phosphor having a maximum luminous wavelength within the range of about 520 to 555 nm; and
   a blue color phosphor having a maximum luminous wavelength within the range of about 440 to 460 nm, wherein said green color phosphor has only one maximum luminous peak corresponding to the luminous wavelength range of about 520 to 555 nm.

2. The fluorescent lamp as claimed in claim 1, wherein said green color phosphor is formed by $Zn_2SiO_4:Mn^{2+}$ with $Mn^{2+}$ as an activator.

3. The fluorescent lamp as claimed in claim 1, wherein said blue color phosphor has a luminous spectral distribution of a line shape.

4. The fluorescent lamp as claimed in claim 3, wherein said blue color phosphor has a luminous spectral distribution which half band width is about 40 nm or narrower.

5. The fluorescent lamp as claimed in claim 3, wherein said blue color phosphor is formed by one selected from the groups of $Sr_{10}(PO_4)_6Cl_2:Eu^{2+}$, $(Sr,Ca)_{10}(PO_4)_6Cl_2:Eu^{3+}$ and $(Sr,Ca)_{10}(PO_4)_6nB_2O_3:Eu^{2+}$.

6. A fluorescent lamp comprising:
   a red color phosphor having a maximum luminous wavelength within the range of about 600 to 620 nm;
   a green color phosphor having a maximum luminous wavelength within the range of about 520 to 555 nm; and
   a blue color phosphor having a maximum luminous wavelength within the range of about 440 to 460 nm, wherein said blue phosphor has a luminous spectral distribution of a line shape.

7. The fluorescent lamp as claimed in claim 6, wherein said blue color phosphor has a luminous spectral distribution which a half bandwidth is about 40 nm or narrower.

8. The fluorescent lamp as claimed in claim 6, wherein said blue color phosphor is formed by one selected from the groups of $Sr_{10}(PO_4)_6Cl_2:Eu^{2+}$, $(Sr,Ca)_{10}(PO_4)_6Cl_2:Eu^{3+}$ and $(Sr,Ca)_{10}(PO_4)_6nB_2O_3:Eu^{2+}$.

9. A liquid crystal display device having a fluorescent lamp comprising:
   a red color phosphor having a maximum luminous wavelength within the range of about 600 to 620 nm, a green color phosphor having a maximum luminous wavelength within the range of about 520 to 555 nm, and a blue color phosphor having a maximum luminous wavelength within the range of about 440 to 460 nm, wherein said green color phosphor has only one maximum luminous peak corresponding to the maximum luminous wavelength of about 520 to 555 nm.

10. The liquid crystal display device as claimed in claim 9, wherein said blue color phosphor of said fluorescent lamp has a luminous spectral distribution of a line shape.

11. A liquid crystal display device comprising:
    a red color phosphor having a maximum luminous wavelength within the range of about 600 to 620 nm, a green color phosphor having a maximum luminous wavelength within the range of about 520 to 555 nm, and a blue color phosphor having a maximum luminous wavelength within the range of about 440 to 460 nm, wherein said blue color phosphor has a luminous spectral distribution of a line shape.

12. The liquid crystal display device as claimed in claim 11, wherein said blue color phosphor of said fluorescent lamp has a luminous spectral distribution which half band width is about 40 nm or narrower.

* * * * *